Sept. 28, 1965 H. C. BRAUCHLA ETAL 3,208,591
DRY CONCENTRATOR

Filed March 5, 1962 5 Sheets-Sheet 1

INVENTOR
HERBERT C. BRAUCHLA
PAUL P. RUMINSKY
BY John Gibson Simmes
ATTORNEY

Sept. 28, 1965  H. C. BRAUCHLA ETAL  3,208,591
DRY CONCENTRATOR
Filed March 5, 1962  5 Sheets-Sheet 2

INVENTOR
HERBERT C. BRAUCHLA
PAUL P. RUMINSKY
BY *John Gibson Semmes*
ATTORNEY

Sept. 28, 1965   H. C. BRAUCHLA ETAL   3,208,591
DRY CONCENTRATOR

Filed March 5, 1962   5 Sheets-Sheet 3

INVENTOR
**HERBERT C. BRAUCHLA
PAUL P. RUMINSKY**
BY *John Gibson Semmes*
ATTORNEY Sept. 28, 1965  H. C. BRAUCHLA ETAL  3,208,591
DRY CONCENTRATOR
Filed March 5, 1962  5 Sheets-Sheet 4

INVENTORS
HERBERT C. BRAUCHLA
PAUL P. RUMINSKY
BY John Gibson Semmes
ATTORNEY

Sept. 28, 1965  H. C. BRAUCHLA ETAL  3,208,591
DRY CONCENTRATOR
Filed March 5, 1962  5 Sheets-Sheet 5

INVENTOR
HERBERT C. BRAUCHLA
PAUL P. RUMINSKY
BY John Gibson Semmes
ATTORNEY

United States Patent Office 3,208,591
Patented Sept. 28, 1965

3,208,591
DRY CONCENTRATOR
Herbert C. Brauchla, Box 349, Fremont, Ohio, and Paul P. Ruminsky, Amherst, Ohio; said Ruminsky assignor to said Brauchla, Fremont, Ohio
Filed Mar. 5, 1962, Ser. No. 177,557
1 Claim. (Cl. 209—147)

The present application is a continuation-in-part of the inventor Brauchla's Apparatus for Concentration, filed August 28, 1961 under Serial No. 134,404 and now abandoned.

The present invention concerns concentration of matter, particularly an apparatus for the continuous line, centrifugal concentration of matter without the use of water.

Since the winning of the west inventors have directed themselves to the task of concentrating mineral matter. Principally, water has been employed as the concentrating force. However, more recently centrifugal forces, floatation effects and magnetism have been adapted rather unspectacularly to the task. A principal shortcoming of the centrifugal concentrators has been their reliance upon great quantities of water, which precludes their portability. Also, a shortcoming of centrifugal concentrators has resided in the difficulty of separating the waste material or gangue from the concentrated values. In agricultural centrifugal separators, for example, very precise limits of cut-off are required in order that the separated wheat might not be impacted with the chaff. Normally, in both agricultural and mineral centrifugal separators the value and separated waste agglomerate in two layers upon the walls of the centrifuge, necessitating frequent shutdown in order to remove a concentrated "batch" of value from beneath the caked waste. None of these devices have refined controls for varying the rate of centrifugation or the rate of removing of value from waste and none have been conveniently adaptable to employment together with other such devices in bank or series. A shortcoming of floatation devices, in addition to their reliance upon water, has been their limitation to treating only finely ground mineral matter. The fine grinding of mineral matter prior to extraction of value is, of course, an expensive process.

The present apparatus distinguishes from conventional centrifugal separators in its elimination of water as a lubricant or concentrating force and its provision for efficient removing of waste from the concentrated value. According to the present invention, any type of matter having value and waste portions of varying specific gravity is centrifuged, the heavier value portion is thus separated from the lighter waste portion, then within the area of centrifuge the separated waste portion is cascaded while the concentrated value portion is axially advanced towards a recovery area, and the cascading waste portion is blown away from the advancing value portion which may be shielded from the blowing. Thus, there is provided a portable apparatus for concentrating which is not reliant upon water resources. Accordingly, portable access is provided to untapped areas of mineral exploration, including reworking the tailings of abandoned mines. Manifestly, the present apparatus promises to have application also to the removal of valuable metals from industrial waste, the separation of seed from chaff in agricultural material, the concentration of precious metals, rare earths, heavy metals, organic matter and the like.

The apparatus utilizes the specific gravity factor in separation of value from waste material within any given solid matter. It has been found that the apparatus is efficacious in the separation of iron ore from sands and it is anticipated that the present apparatus or modifications thereof will be even more efficient in the removal of values, such as the precious metals, rare earths, and heavy metals which have much greater specific gravities. The material to be separated is centrifuged within an interiorly rifled cylinder in order to separate the value from the waste. Rotation of the cylinder causes the waste to be cascaded within the area of centrifugation and throughout the cylinder cross section. Blower means are employed simultaneously with the cascading in order to blow away the cascading waste from the cylinder. During this blowing away, the value material may be shielded from the blowing by the interior rifling of the cylinder and axially advanced thereby to a recovery bin. It is contemplated that both the centrifugal separating, cascading, blowing and advancing steps may be accomplished substantially simultaneously in the present apparatus.

Accordingly, it is an object of invention to provide a continuous line apparatus for dry concentration of matter.

Another object of invention is to provide an apparatus for centrifugal separation of matter wherein caking of separated value with waste is eliminated.

Another object of invention is to provide an apparatus for centrifugal separation of solid matter wherein air is employed for removal of waste from the separated value.

Yet additional objects of invention will become apparent from the ensuing specification and attached drawings wherein.

Figure 8:
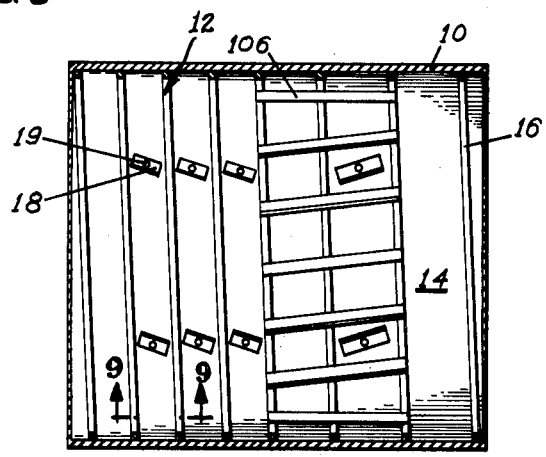
Figure 9:
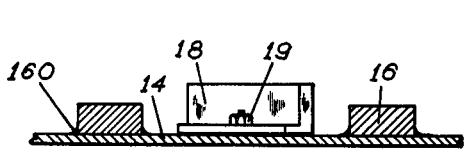
Figure 10:
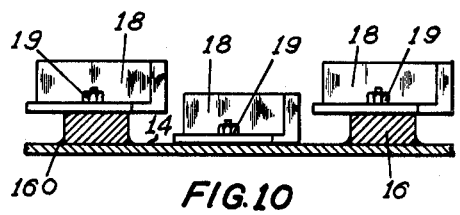
Figure 11:
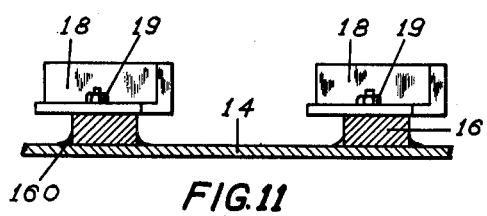
Figure 12:
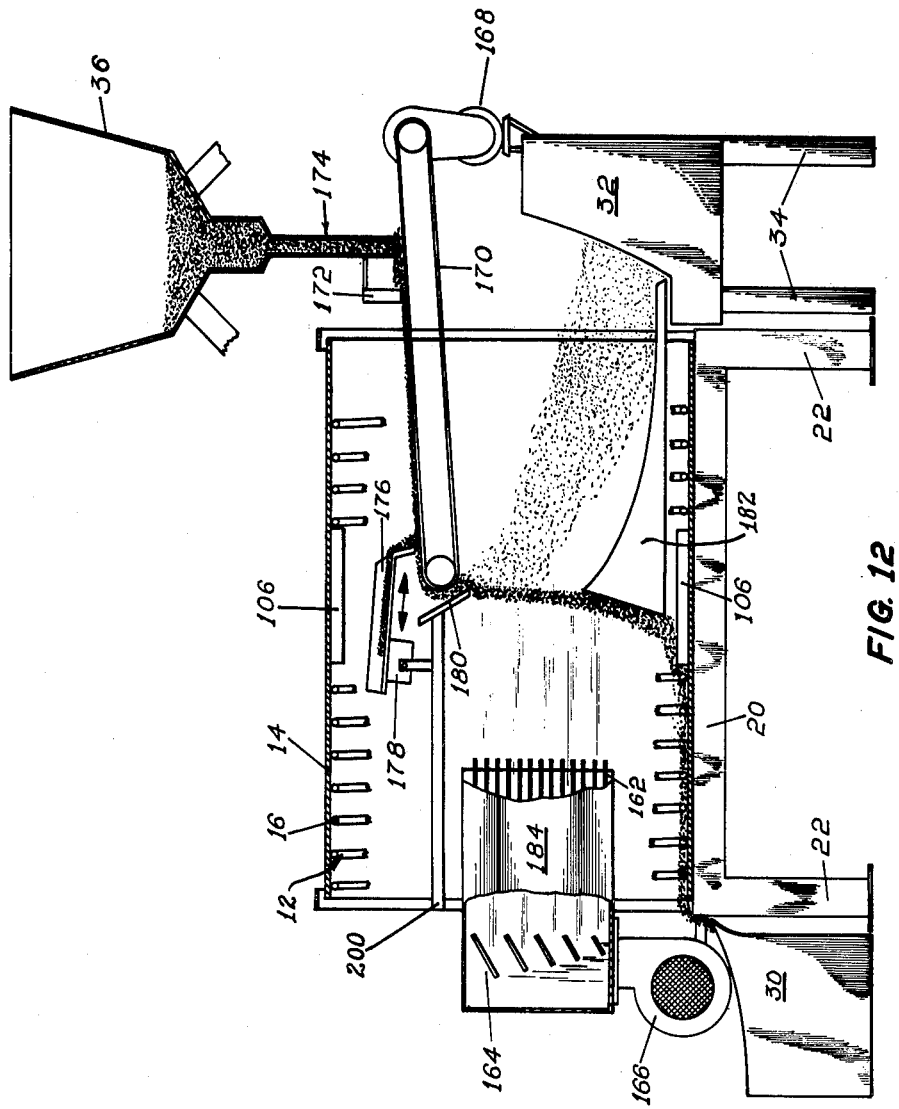

FIG. 8 is a horizontal cross section of the cylinder showing both oblique vanes 18 positioned within the helical groove 14 and longitudinal vanes 106 mounted upon parallel portions of said rifling so as to intersect and extend over parallel portions of said helical groove;

FIG. 9 is a fragmentary vertical section taken along section line 9—9 of FIG 8 showing vane 18 adjustably positioned by set screw means 19 upon the interior wall of the cylinder, FIG. 10 is a similar view showing a modification of invention wherein the vanes 18 are positioned both with the helical groove and mounted upon the rifling itself, FIG. 11 is a similar view of a modification wherein vanes 18 are positioned solely upon the top of rifling 16; and FIG. 12 is a longitudinal cross section of a modified cylinder with endless belt charging component 170, shaker table re-washer 176, directional air blower 184 and knife separator 182.

Figure 1:
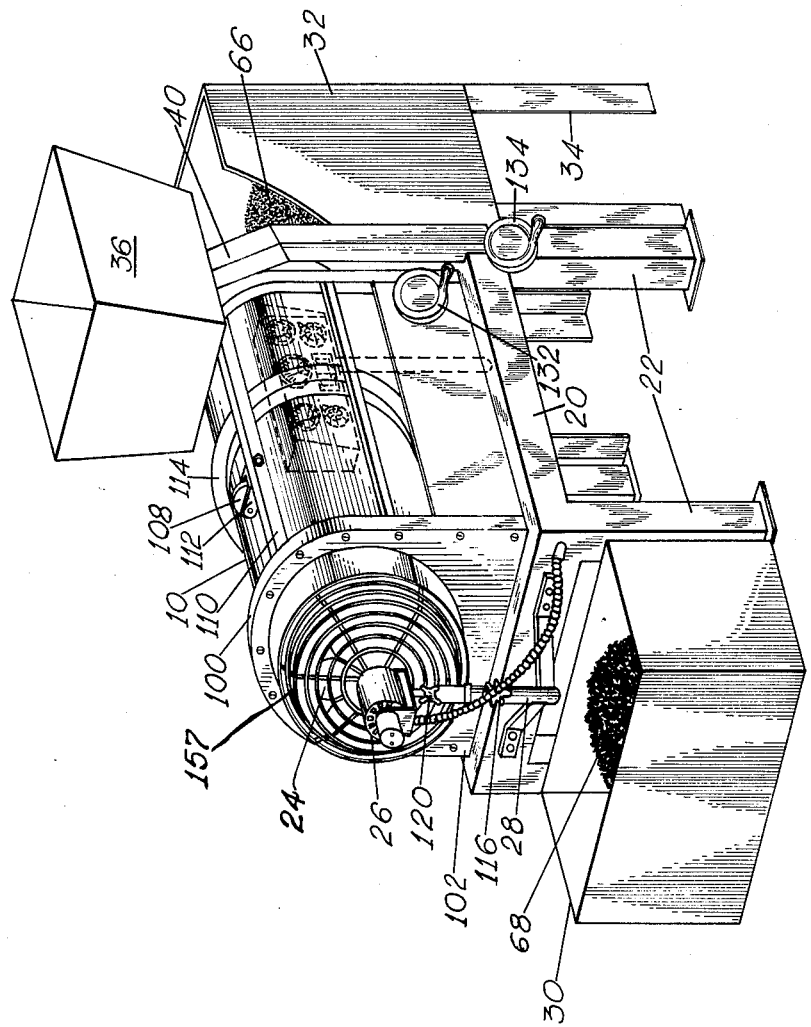
FIG. 1 is a perspective view of our centrifugal concentrator with the control box shown in phantom.
Figure 2:
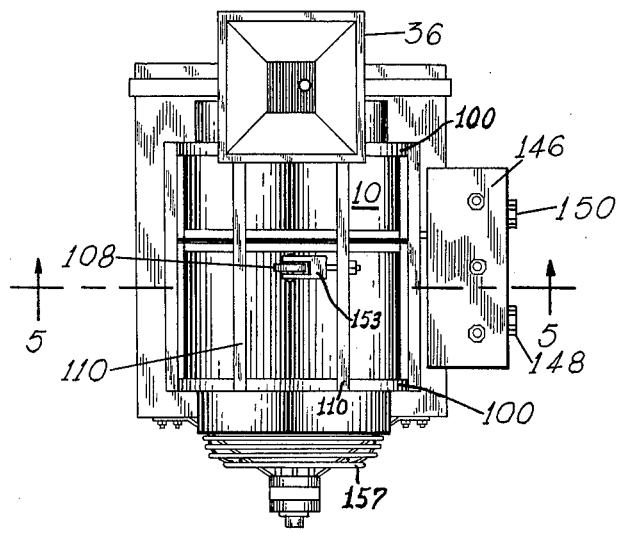
FIG. 2 is a top plan.
Figure 3:
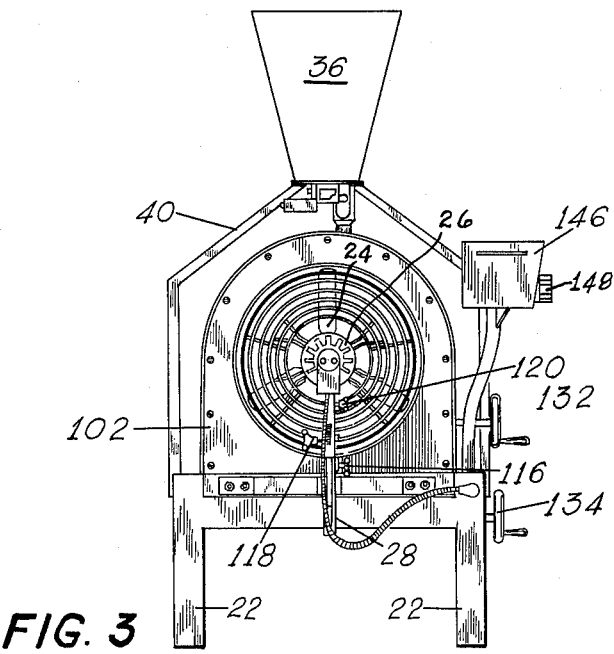
FIG. 3 is a rear or discharge end view of the concentrator showing the fan mounted coaxially of the cylinder.

In FIGS. 1–2 cylinder 10 is shown as rotatably positioned within frame end pieces 100 and connecting longitudinal members 110, the said frame end pieces being mounted upon longitudinal frame members 20 and legs 22. Cover pieces 102 and 104 may be affixed respectively to the discharge end and charging end pieces 100. Also, an additional cover piece (not illustrated) may be attached by means of screws to longitudinal frame members 110 and end pieces 100 so as to cover the rotating cylinder. A top idler roller 108 is secured by a bracket 153 to member 110 so that roller 108 engages the rotating body of the cylinder.

Figure 5:
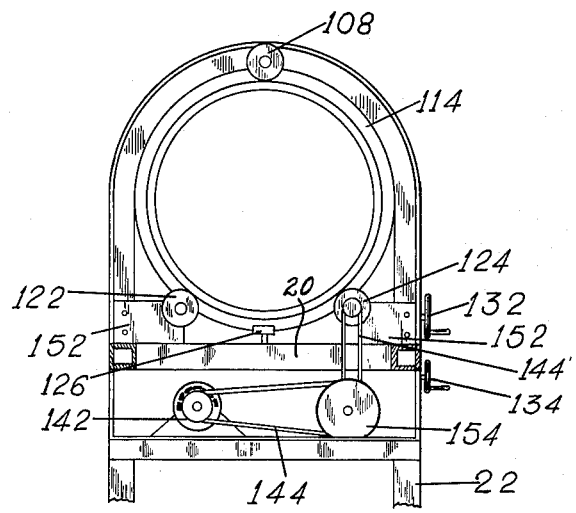
FIG. 5 is a vertical section of the concentrator taken along section line 5—5 of FIG. 2 with cover removed and showing the driving means for the concentrator cylinder.
Figure 6:
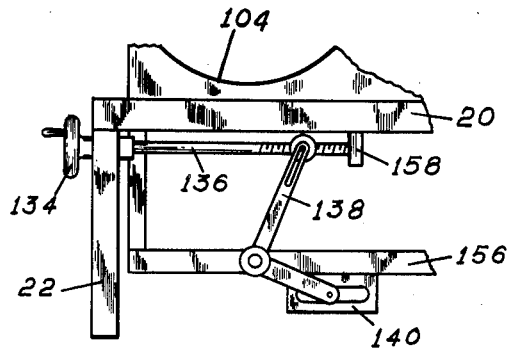
FIG. 6 is an enlarged detail of the crank means for varying the inclination of the cylinder with respect to the supporting frame.

As illustrated in FIG. 5, cylinder 10 is guided by idler rollers 122 attached to blocks 152 engaging the medial flange 114 of cylinder 10 and also by lower guide piece 126 secured to frame member 20. Motor 142 drives belt 144 which in turn drives idler roller 154 connected by belt 144 to driving roller 124. Speed of rotation of the drum is controlled by externally positioned crank handle 132 which varies the distance of driving roller 124 from roller 154 and thus the speed of rotation of cylinder 10. As illustrated in FIGS. 5 and 6 cylinder inclination control crank 134 is attached to threaded rod 136 secured to frame 20 by depending bracket 158. An articulated yoke 138 engages the threaded portion of rod 136 so that as rod 136 is cranked in one direction the yoke 138 is straightened and correspondingly, the drum cylinder cradle 156, attached to yoke 138 with sliding mechanism 140, is pivoted within frame 20 for inclination, as desired.

Figure 4:
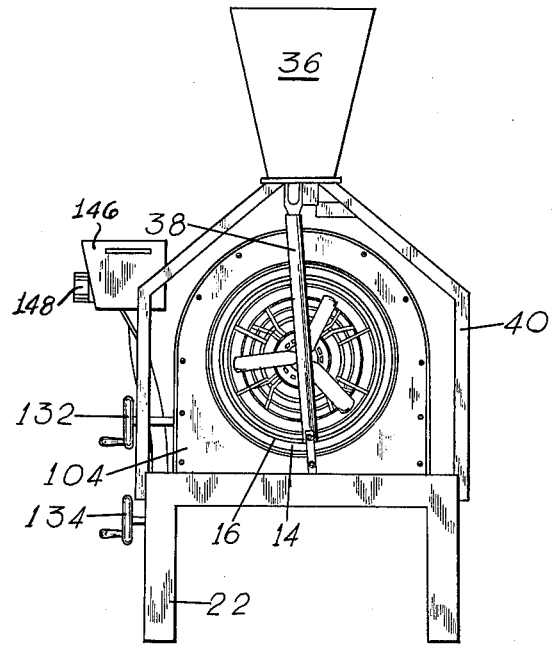
FIG. 4 is a front or charging end view of the concentrator.
Figure 7:
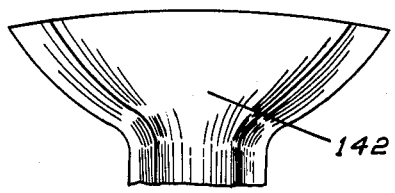
FIG. 7 is an enlarged top plan of a wing tip charging piece.

Cylinder 10 embodies interior rifling 12 comprised of groove portions 14 and land portions 16. In actual practice this rifling 12 may be achieved by the positioning of a helically wound wire of either round or rectangular cross-section and welding or the like may be employed to secure the wire to the interior walls of cylinder 10. Fan 24 rotatably supported upon stand 28 and driven by motor 26 may be positioned at the lower end of cylinder 10. Matter to be separated is charged in hopper 36 supported by bracket 40 attached to waste recovery box 32. Legs 34 may provide support for waste recovery box 32. Flexible tube 38, shown fragmentarily, leads from hopper 36 inwardly of cylinder 10, as illustrated in FIG. 4 and may embody at its discharge ends wing tip discharge piece 142 illustrated in FIG. 7. Tube 38 may extend inwardly to the first of a series of vanes 18, which assist in lateral stabilization of the matter to be concentrated.

Matter charged through flexible tube 38 into cylinder 10 is subjected transversely to centrifugal forces resulting from rotation of cylinder 10 and longitudinally to blowing forces resulting from fan 24. The heavier value 68 is separated centrifugally and urged against the walls of cylinder 10. This heavier value 68 actually is positioned within grooves 14 of the walls and due to inclination of cylinder 10 is advanced by gravity, as well as land portion or rifling 16, downwardly through the cylinder 10 beneath fan 24 and into value receiving box 30. Simultaneously with this centrifugal separation, the lighter waste 66 is cascaded throughout the cross-section of cylinder 10 by the rotation of the cylinder. This cascading waste 66 is thus subjected to the blowing of fan 24 and is conveyed longitudinally by this blowing through cylinder 10 and into waste receiving box 32. In actual operation value 68 passes beneath the blades of fan 24 which is adjustably mounted to avoid disturbance of the downward travel of value 68.

A protecting grid cover 157 may encompass the fan 24. The rate of rotation of the fan itself being regulated by conventional voltage control means 148 positioned in control box 146. A suitable amperage indicating dial may be employed therewith to indicate the rate of rotation of the fan. Similarly, matter to be separated may be charged by motor driven auger, in turn regulated by a knob and a corresponding amperage indicator dial. The position of the fan 24 itself is regulated by knobs 116, 118 and 120 which provide respectively for vertical positioning, tilting or lateral pivoting of the fan 24 with respect to cylinder 10. In actual practice the fan 24 is normally directed so that the path of air impinges on the bottom half two-thirds of the cylinder, so that value initially charged in the cylinder is not blown before centrifugation into box 32. As illustrated in FIG. 10, oblique vanes 18 are secured within the groove 14 and upon rifling 16 with nut and bolt or set screws 19 which permit oblique adjustment of the vanes. This positioning of the vanes 18 directly upon the rifling, instead of within grooves 14, has been found to be effective in centrifugation of the lighter values, such as iron. However, in centrifugation of the heavier values such as lead the modifications shown in FIGS. 10 or 11 may be employed wherein the vanes are positioned atop the rifling and both within the grooves and atop the rifling. In either case, the actual rifling may be secured to the interior walls of the cylinder by welds 160 or the like in order that a seal is obtained. Similarly, longitudinal vanes 106 (FIG. 8) may be positioned upon a plurality of parallel portions of rifling 16 and positioned adjacent the discharge ends of the cylinder 10. The effect of vanes 106 is to stir up any waste which may have agglomerated as a layer above the centrifugated value and thus provide a last opportunity for the waste to be blown away from the fan 24.

In FIG. 12 a modified cylinder is shown wherein endless belt conveyor 170 driven by drive unit 168 is supported within the cylinder so that its inner end is positioned intermediate longitudinal pick-up tabs 106. Belt 170 extends transversely throughout the cylinder cross section so as to feed a transverse falling wall of matter to be concentrated. Belt 170 may be fed by material hopper distributor 174, the material fed onto the conveyor, in turn, being gauged by rake 172. In this embodiment directional air manifold 184 having deflecting vanes 164 and steering vanes 162 and powered by squirrel cage blower 166 is presented opposite the transverse falling wall or "water fall" of matter so that a concise non-turbulent force of directional air may perpendicularly attack the falling wall. A knife separator 182 may be employed to separate the concentrates and values at the bottom of the waterfall, the lighter tailings or waste being blown onto the backside of knife 182 and thence out of the cylinder. Also in this connection there may be employed a shaker table 176 positioned upon synchronizer drive 178. Table 176 is positioned intermediate the top inner end of belt 170 and longitudinal pick-up tabs 106 in order to present for rewashing matter collected at the bottom of the cylinder 10 and cascaded by pick-up tabs 106 in conventional manner. Synchronizer 178 is of the type known as a shaker table such as manufactured by Denver Equipment Company and Nordberg Manufacturing Company. The shaker table normally consists of a powered vibrating element and provides for regulated feed onto the belt conveyor, according as the volume of matter to be re-cascaded varies. Increase of the vibration of shaker table 176 will result in increased feed of matter onto belt 170. Also, in this connection a deflector plate 180 may be adjustably positioned adjacent the charging end of the belt conveyor to insure that the wall of falling matter is directed perpendicularly to the flow of air from vanes 162. Both deflector 180, the shaker table 176 as well as the belt conveyor may be supported upon brackets fastened to the frame members 200.

It has been found that mineral matter between twenty to fifty mesh are particularly adaptable to separation according to this method. However, matter of greater size than twenty mesh has been successfully separated in the apparatus. Although the matter may be moist, cascading may be precluded, if the material is too wet. In the absence of this cascading, caking of waste layer over the value would occur during centrifugation. Normally, there is no caking, but rather a continuous removing by blowing of separated waste from the concentrated value. Thus, the process is continuous in every sense of the word and there is no necessity for shutdown to remove either value or waste, as is the case in conventional separators.

As will be apparent, the present apparatus provides unique adjustability for centrifugation of values of various weights. This adjustability is provided by individually regulating the rate of charging of matter into the cylinder, the rate of rotation of the cylinder, as well as the rate of rotation and positioning of the fan. Also, different types of vanes may be employed and their obliquity with respect to the interior rifling may be varied. Also, the degree of inclination of the cylinder may be varied, cylinder inclination indicators and frame level indicators being provided for this purpose. The cylinder may assume many dimensions, depending upon the environment in which it will be used. It is estimated that one effective cylinder having both a two foot length and diameter with interior rifling defining a groove of 1½ inches average width provides within the cylinder a centrifugating path approximately 80 feet in length.

Manifestly, various driving means may be employed, the centrifugal separator may be variously configured or closed at both ends and other than a fan blower means might be employed and a plurality of such centrifugal separators might be mounted in banks utilizing conveyor screw or mountain side gravity feed means without departing from the spirit and scope of invention as defined in the subjoined claim.

We claim:

An apparatus for dry concentration of matter having portions of differing specific gravity, comprising:

(a) a rotatable cylinder having a lower value recovery end and a charging and waste recovery end;
(b) rifling located within the interior of said cylinder along the inner walls thereof, said rifling being directed towards said blower so as to shield while axially advancing materials supported therein to said lower value recovery end;
(c) a blower positioned at said lower value recovery end of said cylinder;
(d) a hopper for said matter positioned at said charging and waste recovery end of said cylinder and communicant with said cylinder interior;
(e) one or more vanes mounted in said cylinder so as to extend transversely of said rifling;
(f) means rotating said cylinder at a speed sufficient to urge heavier value matter against said inner walls of said cylinder, while cascading lighter waste matter throughout the cylinder cross-section and before said blower;
(g) means introducing said matter to be concentrated, including a belt feed extended transversely within said cylinder so as to introduce a wall of falling matter within said cylinder; and
(h) a shaker table mounted intermediate the end of said belt feed located within said cylinder and said vanes so as to convey to said belt for re-washing matter cascaded by said vanes.

References Cited by the Examiner

UNITED STATES PATENTS

| | | | |
|---|---|---|---|
| 409,589 | 8/89 | Jacobson | 209—152 |
| 993,593 | 5/11 | Guernsey | 209—152 |
| 1,186,874 | 6/16 | Baer | 209—152 |
| 1,673,848 | 6/28 | Stebbins | 209—473 |
| 2,044,775 | 6/36 | Drefus | 209—473 |
| 2,577,488 | 12/51 | Stephenson | 209—152 |
| 2,941,667 | 6/60 | Hilgartner | 209—134 |
| 3,087,615 | 4/63 | Powell | 209—134 |
| 3,127,340 | 3/64 | Van Buskirk | 209—152 |

HARRY B. THORNTON, Primary Examiner.

ROBERT A. O'LEARY, Examiner.